Patented Nov. 7, 1944

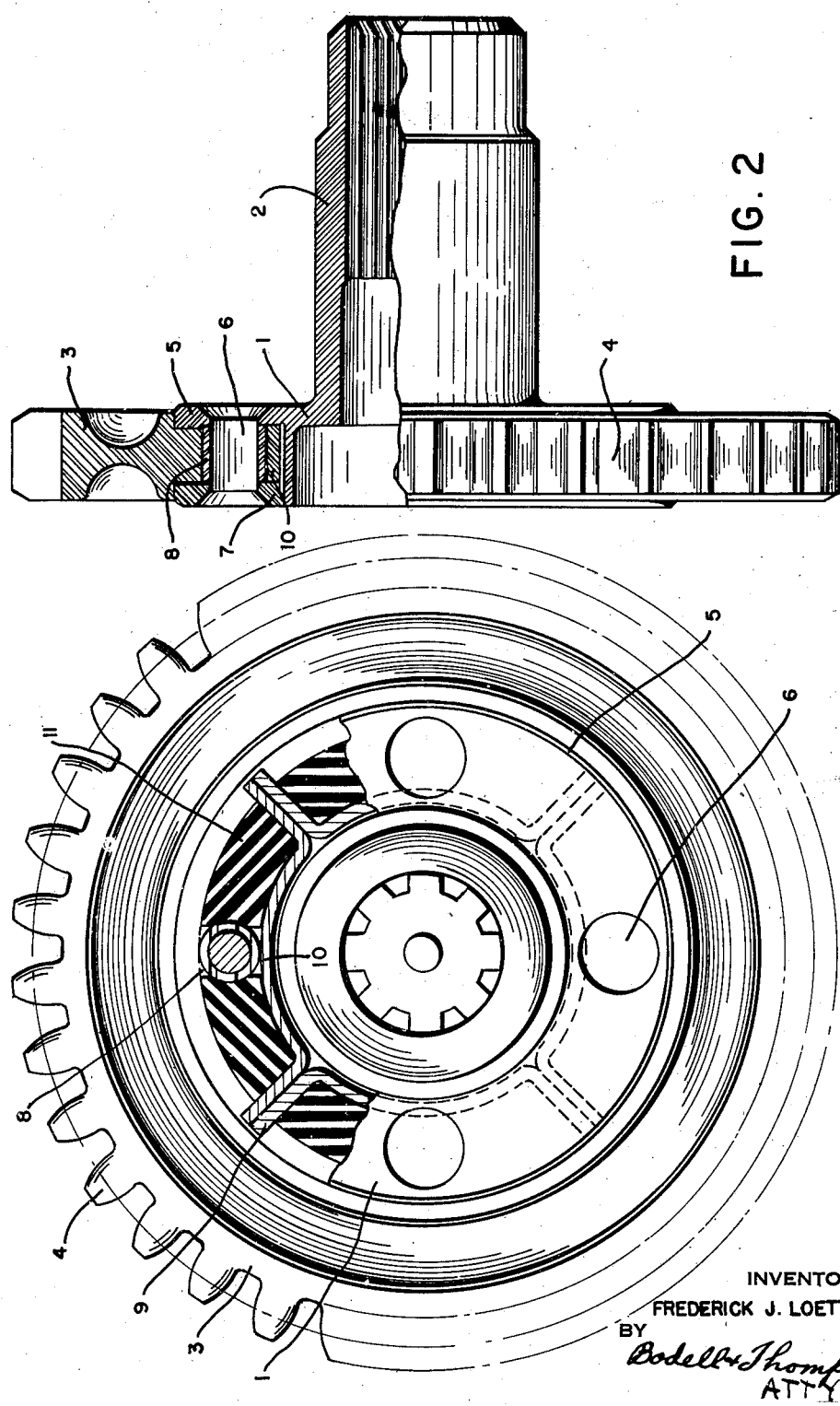

2,362,141

UNITED STATES PATENT OFFICE 2,362,141

VIBRATION ABSORBING GEAR

Frederick J. Loetterle, Syracuse, N. Y., assignor to Aircooled Motors Corporation, Syracuse, N. Y., a corporation of New York Application August 7, 1942, Serial No. 453,994

2 Claims. (Cl. 64—27)

This invention has for its object a vibration absorbing gear for driving parts, as engine accessories, which are subject to vibration developed in shafts, as cam shafts of engines of vehicles, aeroplanes, etc., as for instance, such accessories as the generator, magneto, oil pump, supercharger, vacuum pump, water pump, etc., which are subject to rapid crystallization and breakage due to torque vibration. More specifically, it has for its object a vibration absorbing gear including a hub and an annular gear toothed rim spaced from the hub providing an annular space, and blocks of resilient material in said space and interposed between driving abutments or lugs on one of said parts, as on the hub, which lugs extend into the space parallel to the axis of the gear, and radial lugs on the other of such parts, as on the rim, extending into said space on opposite sides of the driving abutments or lugs.

The invention further has for its object an assembly of parts of vibration absorbing gear in which one side of the annular space is covered by an annular flange on the hub and the driving abutments secured to this flange, and the other side of said space covered by a separate ring or annular plate secured to the driving abutments.

The invention consists in the novel features and in the combinations and constructions hereinafter set forth and claimed.

In describing this invention, reference is had to the accompanying drawing in which like characters designate corresponding parts in all the views.

Figure 1 is an elevation, partly broken away, of a gear embodying this invention.

Figure 2 is an edge view partly in section.

1 designates the hub, which is here shown as provided with a sleeve 2 provided with internal splines for coacting with the splines of a drive shaft, as the cam shaft of an engine. The gear may be used to drive a magneto or similar accessory.

3 designates the rim of the gear which is formed with peripheral gear teeth 4, the rim being radially spaced from the hub. The hub 1 is also formed with an annular flange 5 which laps the inner margin of the rim 3 and constitutes a cover for one side of the annular space between the hub and the rim.

6 designates driving lugs or abutments extending at spaced apart intervals through the flange 5 and into the annular space in a direction parallel to the axis of the gear. These driving lugs are rivets which also extend through a separate retaining ring or annular plate 7, which is secured in position by the lugs 6, which are rivets. The portion of each rivet 6 within the annular space and between the flange 5 and the plate 7 is usually surrounded by a sleeve or bushing 8.

9 designates additional abutments extending into the annular space between the hub and the rim and interlocked with the rim to rotate therewith, there being an abutment 9 on opposite sides of any one driving abutment or lug 6. These abutments are interlocked with the rim 3 extending at their outer ends into internal notches in the rim. These additional abutments are arranged in pairs, and the abutments of each pair are connected by an arcuate strip 10, which overlies the hub and conforms to the curve thereof.

The annular space is preferably filled with rubber shock-absorbing blocks with the exception, of course, of the space occupied by the abutments. 11 designates the rubber blocks located on opposite sides of each driving abutment 6 and interposed between the same and the abutments 9 of each pair. Preferably, the rubber blocks completely fill the annular space with the exception of the spaces occupied by the abutments, but such spaces may not be completely filled and the rubber blocks may be arranged in pairs with the pairs spaced apart but located so as to balance each other as diametrically opposite each other. In the illustrated embodiment of the invention, four pairs of rubber blocks are shown but two diametrically opposite sets of blocks may be omitted.

In operation, assuming that the power is applied to the sleeve 2 of the hub 1, the drive is transferred to the rim 3 through the driving abutments or lugs 6 and through one of each set of rubber blocks 11 to one abutment 9 and through the connecting strip 10 to the other abutment 9 of the same pair. Any torque reaction or vibration is taken by the other block 11 of each pair and transferred to both abutments 9 of each pair. This absorbs or neutralizes the reaction due to torque vibration so that crystallization that results in breakage of rapidly rotating parts is avoided.

What I claim is:

1. A vibration absorbing gear comprising a hub formed with an annular flange and a gear toothed rim radially spaced from the hub, the annular flange on the hub lapping at least the inner margin of the rim on one side thereof, driving abutments extending through the flange and the annular space between the hub and the rim, additional abutments carried by the rim and extending radially of said annular space and being spaced from the driving abutments, blocks of resilient material filling the annular space between the driving and the additional abutments, an annular retaining plate opposed to said flange on the other side of the inner margin of the rim and forming a cover for the annular space, said plate being secured to the driving abutments, and an arcuate strip joining the additional abutments on opposite sides of each driving abutment and following the curve of the periphery of the hub.

2. A vibration absorbing gear comprising a hub and a gear toothed rim radially spaced from the hub, blocks of resilient material filling the annular space between the hub and the rim, driving abutments carried by the hub and extending parallel to the axis of the gear into said annular space, the blocks at their opposing ends thrusting against the driving abutments at opposite sides thereof, additional abutments carried by the rim and extending into said annular space and thrusting against the ends of the blocks opposite to those thrusting against the driving abutments, and a strip underlying the blocks on opposite sides of any one driving abutment and connected at its ends to the additional abutments located on opposite sides of any one driving abutment.

FREDERICK J. LOETTERLE.